Figure 3:
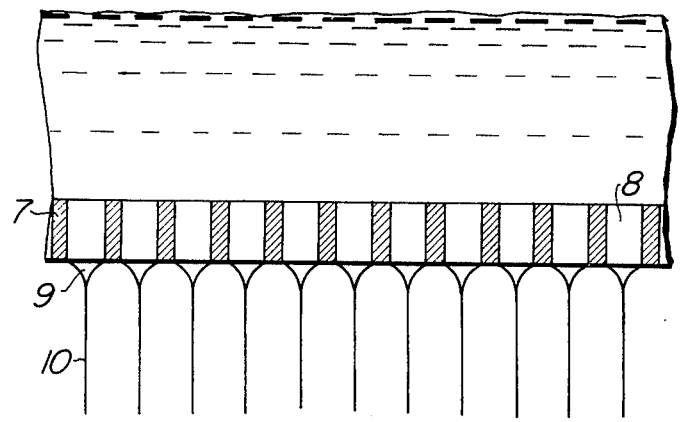

United States Patent [19]

Shono et al.

[11] 4,121,918

[45] Oct. 24, 1978

[54] ORIFICE PLATE FOR USE IN GLASS-FIBER SPINNING HEARTH

[75] Inventors: Hiroaki Shono; Toshio Noji; Isao Wakasa; Shinzo Ishikawa, all of Fukushima, Japan

[73] Assignee: Nitto Boseki Co., Ltd., Fukushima, Japan

[21] Appl. No.: 814,436

[22] Filed: Jul. 11, 1977

[30] Foreign Application Priority Data

Jul. 23, 1976 [JP] Japan .................................. 51-87797

[51] Int. Cl.² ............................................ C03B 37/02
[52] U.S. Cl. ...................................... 65/1; 76/107 S; 425/72 S
[58] Field of Search ..................... 65/1, 2, 11 W, 12; 76/107 S; 425/72 S

[56] References Cited

U.S. PATENT DOCUMENTS

| 3,514,841 | 6/1970 | Woodward et al. ............. 65/1 X |
| 3,526,487 | 9/1970 | Bour ................................... 65/1 |
| 3,905,790 | 9/1975 | Strickland ....................... 65/12 X |

FOREIGN PATENT DOCUMENTS

| 48-3857 | 2/1973 | Japan ............................................. 65/1 |
| 51-7218 | 1/1976 | Japan ............................................. 65/1 |

Primary Examiner—Robert L. Lindsay, Jr.
Attorney, Agent, or Firm—Jay L. Chaskin

[57] ABSTRACT

Disclosed is an orifice plate for use in glass-fiber spinning having a number of densely arranged orifices. Each orifice has a larger diameter at the inlet side thereof facing the molten glass and a smaller diameter at the outlet side thereof facing the ambient air. The ratio of the larger diameter to the smaller diameter is so selected to fall within a range between 1 : 0.4 and 1 : 0.9. The reduced diameter of the orifices at their outlet side provides sufficiently large space between adjacent orifices at their outlet sides, in spite of the high density at which the orifices are arranged, so that the joining of glass cones suspended from respective orifices is conveniently avoided even after the brims of the orifices are ground by the viscous cooled molten glass.

4 Claims, 10 Drawing Figures

FIG. 1
FIG. 2
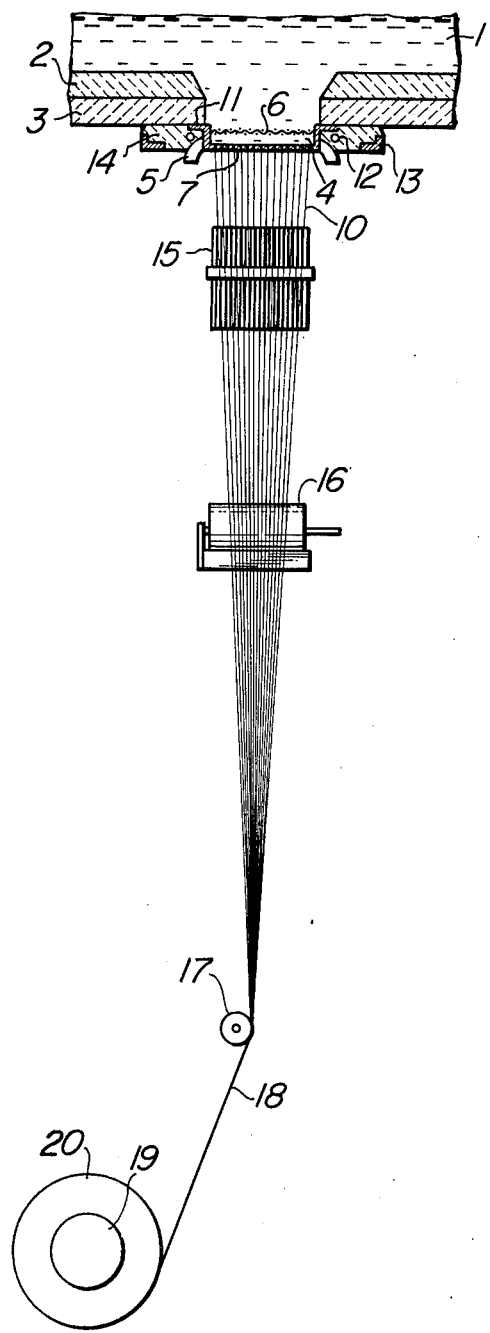
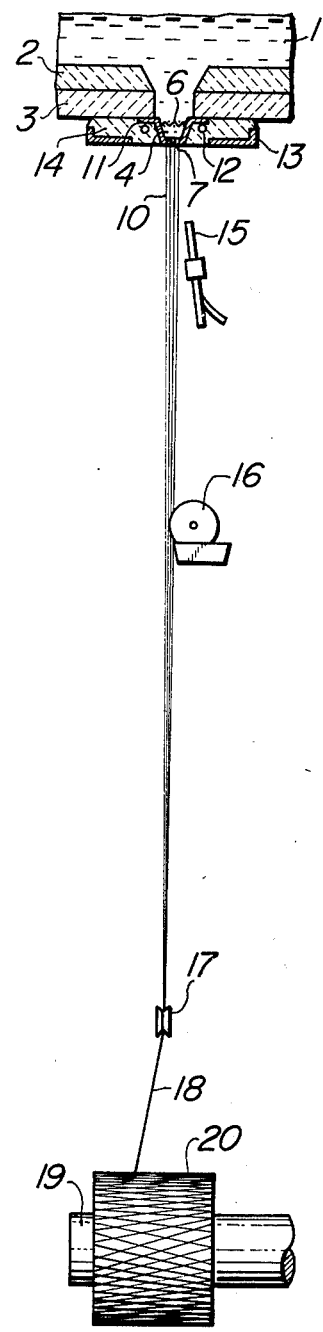

ORIFICE PLATE FOR USE IN GLASS-FIBER SPINNING HEARTH

The present invention relates to an orifice plate for use in a bushing for spinning glass fibers and, more particularly, to the shape of orifices which are densely arranged in an orifice plate having a plain surface.

One of the effective methods for improving the yield of glass fibers is to use an orifice plate having as many orifices as possible formed therein. However, when the orifices are arranged too densely, i.e. when the distance between adjacent orifices is made too small, cones of molten glass suspended from the underside of the orifice plate and consisting of masses of molten glass having passed through respective orifices inconveniently join the adjacent ones due to capillary action thereby to cause a so-called "flooding" condition to undesirably deteriorate the spinning. For this reason, there has been a practical limit in increasing the density at which the orifices are arranged in the orifice plate.

In order to avoid the joining of the molten glass cones, i.e. in order to avoid the flooding of the orifice plate, U.S. Pat. No. 3,905,790 proposes to apply an upward air stream to the downside of the orifice plate, to allow a satisfactory spinning of glass fibers employing an orifice plate in which a great number of orifices are disposed at such a density as would for otherwise cause the joining of the glass cones to hinder the spinning. This proposal is to prevent the molten glass cones from joining one another, through increasing the viscosity of the molten glass cones by cooling the surface of the latter with the air flow. However, the increase of the viscosity results, on the other hand, in an increased wear of the discharge section of each orifice, so as to enlarge the size of the discharge opening of the orifice. Consequently, the distance between adjacent orifices becomes small in a short time to inconveniently allow the joining of the molten glass cones and thus result in deterioration of the working efficiency of the spinning apparatus.

It is therefore an object of the invention to overcome the above problem inherent in the prior art by providing an improved orifice plate which can be used, thanks to a specific shape of the orifice formed therein, for a longer time without suffering from the joining of the glass cones.

To this end, according to the invention, there is provided an orifice plate for use in a bushing for spinning glass fibers, having plain up and downside surfaces and a great number of densely arranged orifices formed therein, each of said orifices having a ratio of the diameter at its inlet side to that at its outlet side between 1:0.4 and 1:0.9.

Figure 4:
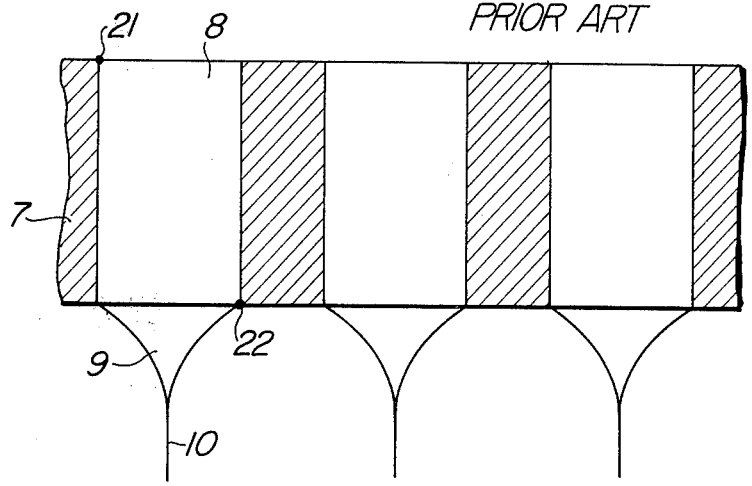
Figure 5:
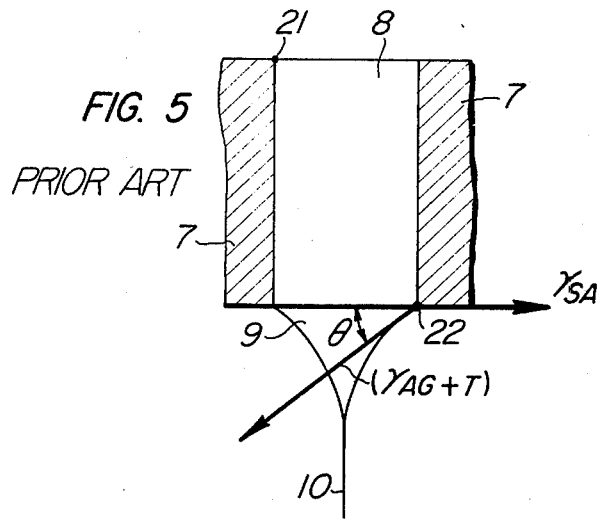
Figure 6:
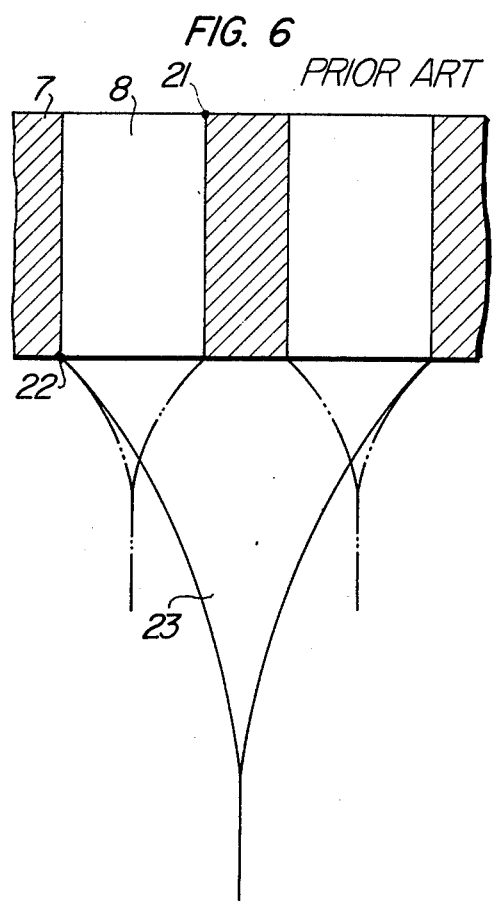
Figure 7:
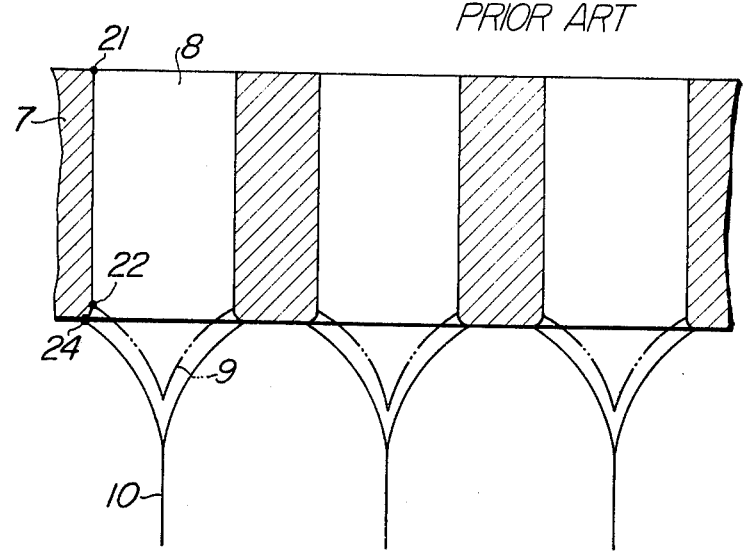
Figure 8:
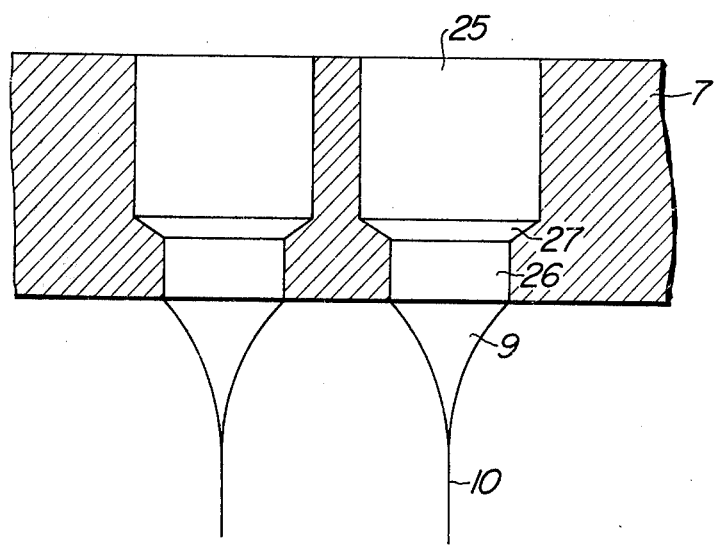
Figure 9:
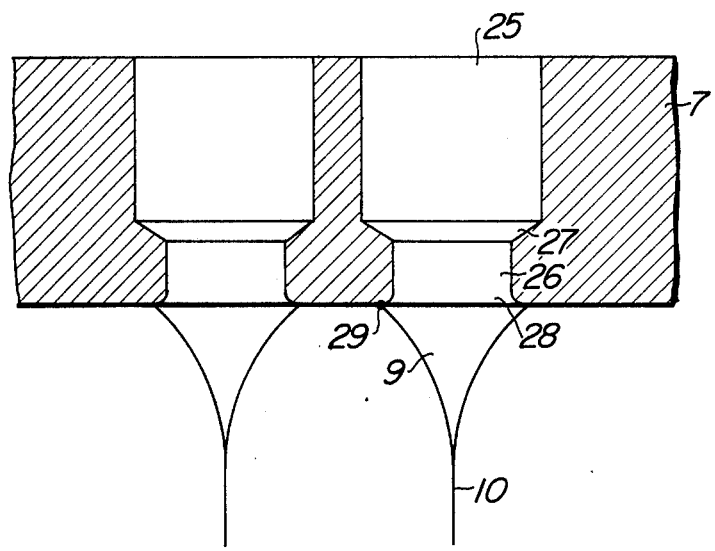
Figure 10:
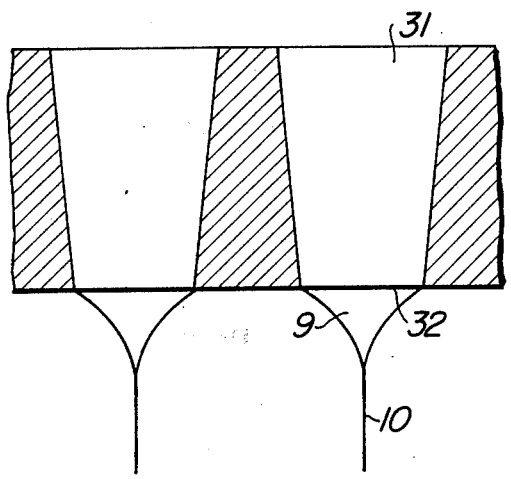

The above and other objects, as well as advantageous features of the invention will become clear from the following description of preferred embodiments taken in conjunction with the attached drawings in which:

FIG. 1 is a front elevational view of an apparatus for producing glass fibers by employing a bushing provided with a number of densely arranged orifices, FIG. 2 is a side elevational view of the apparatus as shown in FIG. 1, FIG. 3 is an enlarged sectional view of a conventional orifice plate used in the apparatus of FIG. 1, FIG. 4 is an enlarged cross-sectional view showing the shape of orifice in the orifice plate of FIG. 3 before wearing, FIG. 5 is a diagramatical view explaining an equilibrium of forces applied to a molten glass cone at the underside of the orifice of FIG. 4, FIG. 6 is a diagramatical view showing a manner in which glass cones suspended from adjacent orifices as shown in FIG. 4 join each other, FIG. 7 is a schematic illustration of a worn edge of the orifice of FIG. 4 after the use for a certain time, FIGS. 8 and 9 are sectional views of an orifice of an embodiment in accordance with the invention, before and after the use, respectively, and FIG. 10 is a sectional view of an orifice of another embodiment in accordance with the invention, before the use.

Before describing preferred embodiments of the invention, the glass fiber spinning method as proposed in the aforementioned U.S. Pat. No. 3,905,790 will be explained with specific reference to FIGS. 1 through 3. Molten glass heated to an appropriate temperature by means of a fore hearth is allowed to flow into a spinning hearth 4, through a bore formed in a bushing block consisting of a laminated structure of a zirconium refractory material 2 and a mullite refractory material 3. The spinning hearth itself as a whole produces a heat as it is supplied with electric current through terminals 5, to preserve a temperature suitable for the spinning. A screen 6 having a number of fine apertures is welded to an upper portion of the hearth to regulate the flow of molten glass coming from the bore of the bushing block, and to prevent contaminates such as fragments of the refractory materials, devitrified glass, striae, and other undissolved matters from coming into the hearth. The molten glass having passed the screen 6 is allowed to reach an orifice plate 7. The molten glass is then discharged into the atmosphere by the static head or pressure established in the hearth, through orifices 8. The masses of molten glass discharged through respective orifices then are formed into glass cones 9 suspended from the downside of the orifice plate, and are gradually solidified to become glass filaments 10.

The spinning hearth 4 is provided at its uppermost portion with a flange 11 which is in close contact with the bushing block 3 thereby to prevent the leakage of the molten glass. A cooling water circulating coil 12 is disposed just below the outer periphery of the flange 11 to cool the latter. A castable refractory structure 14 is held by a frame 13 to the hearth to surround the latter to preserve the temperature in the spinning hearth. The spinning hearth is made of a thermally stable material such as alloy of platinum and rhodium, while the orifice plate is constituted by alloy of platinum and rhodium, alloy of platinum, rhodium and gold, alloy of platinum, gold and palladium and the like.

The masses of molten glass discharged through the orifices are cooled by air flow jetted from an air nozzle 15 consisting of a plurality of pipes disposed beneath the hearth, to form the aforementioned cones of molten glass.

This cooling by blowing air is indispensable for forming the molten glass cones, since the molten glass would stick to the downside of the orifice plate as a plurality of masses or lumps which naturally drops due to the gravity, provided that there is no means for applying the cooling air.

The air nozzle 15 is connected to a hose not shown, so as to be supplied with a pressurized air of a comparatively low pressure from an air source such as an air compressor or a blower. A number of independent glass filaments 10 are then brought into contact with a sizer 16 to be applied with a size. Subsequently, the filaments are made to pass a gathering shoe 17 to become a single strand 18 which is then wound around a take-up winder 19 to become a roving 20.

Conventionally, each orifices is in a form of round hole as shown in FIG. 3. As will be seen from FIG. 4 showing the orifices in an enlarged scale in section along a plane perpendicular to the plane of the orifice plate, the walls of orifices are at right angle to the plane of the orifice plate, at an inlet portion 21 thereof confronting the molten glass and at an outlet portion 22 facing the atmosphere, when the orifice plate is still fresh.

FIG. 5 shows an equilibrium of forces acting on an independent molten glass cone from one of the orifices. Representing the interfacial tension existing between the outer surface of the orifice and atmosphere by $\gamma SA$, the surface tension acting between the peripheral surface of the molten glass cone at the outlet portion 22 of the orifice and atmosphere by $\gamma AG$, the component tangential to the glass cone at the outlet portion 22 of a tensile force exerted downwardly by the taking-up winder by T, and the angle formed between the direction of the tangential force and the horizontal surface by $\theta$, the equilibrium is given by the following equation (1).

$$(\gamma AG + T) \cos \theta = \gamma SA \quad (1)$$

As the temperature of the glass gets lower, the tensile force T exerted on the molten glass cone by the taking-up winder becomes larger and the shape of the glass cone is so varied as to decrease the angle $\theta$, due to the increase of the viscous resistance, while the values of the $\gamma SA$ and $\gamma SG$ are hardly affected by the temperature. Therefore, the value of $(\gamma AG + T) \cos \theta$ gets large as the temperature is lowered, so that the left side of the above equation (1) becomes large enough to ensure an enhanced stability of the glass cone.

The lowering of the temperature must not be attained solely by reducing the electrical power supply to the orifice plate. Namely, the reduced electrical power supply to the orifice plate results in a reduction of the temperature of the orifice plate as a whole, which in turn would cause an excessively large resistance against the flow of the molten glass passing through the orifice. Therefore, the supply of the molten glass through respective orifices would become insufficient to form good molten glass cones.

In view of the above it is required that not only a large electric power must be applied to the orifice plate so as to ensure sufficient supply of the molten glass through orifices but also an upward air flow should be directed to the orifice plate so as to rapidly cool the molten glass as soon as it meets the ambient air. In such case the upward flow of the air serves to cool the whole orifice plate as well, but the large electric power supply to the orifice plate is enough to establish a large temperature drop between the inlet and outlet portions 21, 22 of the orifices for compensating for the temperature reduction effected by the air flow.

Supposing now that the rate of the air flow is decreased by a certain amount, or the air supply is completely stopped, the cooling effect provided by the air is decreased or lost to render the glass cones unstable. Also, the glass cones are rendered unstable, when the downward tensile force and, accordingly, the component T of the tensile force is decreased.

In such case, the equilibrium represented by the equation (1) is lost to present a condition given by the following equation (2).

$$(\gamma AG + T) \cos \theta < \gamma SA \quad (2)$$

Thus, the molten glass at the base portion of the glass cone is caused to flow along the outer surface of the orifice plate to join the glass cone from adjacent orifice thereby to form a larger glass cone 23, as illustrated in FIG. 6. If the relationship represented by the equation (2) is still maintained in spite of the forming of the larger glass cone 23, the joining of the glass cones will be spread over three four or more orifices, to cause the aforementioned flooded condition of the orifice plate.

During the spinning, a sufficient tensile force exerted by the taking-up means and the moderate cooling air supply in combination ensure the stable form of the glass cones as shown in FIGS. 3 and 4. However, the tensile force is inconveniently decreased during a period in which the roving is dismounted from the take-up winder until the taking-up is commenced again, scarcely preserving the condition of the equation (1). Thus, during that period, only a small further decrease of the tensile force and/or local shortage of cooling by air would turn the situation to the condition of the equation (2).

As a matter of fact, it has been often experienced that when the tensile force is decreased for certain glass cones to allow their filaments to slack, the joining of the glass cones is observed at the orifices from which the slacked filaments are spun. Once this joining of the glass cones has taken place, the separation of the cones into original independent filaments can be made only through an application of a specific vigorous air flow to the portion where the joining is taking place.

In addition, the conventional orifice plate has involved a fundamental drawback that the outlet portion 22 of the wall of the orifice is worn down, as the time elapses, to have a rounded shape as shown in FIG. 7, so as to allow a behaviour of the molten glass as if the distance between the adjacent orifices is made small. Since the cooling performed by the air flow presents a considerably steep gradient of the temperature between the inlet and outlet portions 21, 22 of the orifices, the temperature of the molten glass around the outlet portion 22 is considerably low to exhibit a large viscosity. The consequent large friction between the molten glass and the outlet portion of the orifice promotes the wear of the latter, so that the edge of the orifice at the outlet side is ground to have a round profile of a certain curvature.

After the edge of the orifice has been ground, the marginal edge of the cone is maintained at the lowermost end 22 of the wall portion having the original diameter of the orifice, during the spinning. However, once the spinning is suspended, the position of the marginal edge is shifted to the enlarged lowermost brim 24, so that the base portions of the adjacent glass cones get closer to each other, so that they are ready to join each other.

The decrease of the distance between adjacent orifice due to the grinding or wear down of the outlet-side edge of the orifice facing the atmosphere brings about some inconveniences as follow.

(1) Once the glass cones are merged into or join each other to present the flooded condition, it is quite difficult and time consuming to retrieve the original condition in which the cones are separated to provide independent filaments. This is attributable to the face that cones once separated are apt to rejoin each other in the course of the separation of remaining cones, thereby deteriorating the separation efficiency. In general, it takes about 8 minutes to achieve the complete separation when the orifice plate is still fresh, and about 15 to 30 minutes when the grinding or wear down of the edges of the orifices have made certain progress.

(2) The joining of the glass cones takes place when the spinning is suspended. The joining is caused, as stated before, even by a slight local temperature rise, insufficient cooling or by a shortage of the tensile force.

(3) The joining of the cones as stated in above item (2) can be avoided by increasing the rate of the cooling by air, which may, however, result in overcooling of the filaments during the normal spinning process to cause a breakdown of the filaments.

Thus, the conventional orifice plate has employed with less working efficiency and an increased frequency of the breakdown of the filaments.

The grinding or wear down of the orifices is inherent in the spinning apparatus as relying upon the cooling by air, while the deterioration of the working efficiency due to the grinding or weardown of the orifices has a close connection to a high density at which the orifices are arranged in the orifice plate. The words "high density" are used herein to mean such a density of the orifices, i.e. the spacing of the orifices, as would naturally allow the joining of the glass cones from respective orifices, were it not for the application of the cooling air onto the glass cones.

The density or the spacing of the orifices depends on various factors such as the amount of molten glass within the spinning hearth, composition of the glass, melting temperature of the glass, spinning temperature, diameter of the orifice, spinning rate, amount and velocity of the cooling air applied to the orifice plate and so on. The distance between adjacent orifices is typically 0.3 to 1.0 mm, as measured at their walls.

The present invention is therefore intended in manufacture of glass fibers employing an orifice plate having plane surface and provided with a number of orifices arranged at a high density, and cooling air directed upwardly to the orifice plate to improve the shape of each orifice such that the amount of molten glass discharged through the orifices is regulated and limited so as to avoid the undesirable joining of the molten glass and other inconveniences as mentioned before, thereby to improve the working efficiency of the spinning apparatus.

After a series of intense study and experiments, we have reached a conclusion that the above stated improvement is attained by forming each orifice in such a shape that the ratio of diameter at its inlet side to that at its outlet side falls within a range between 1:0.4 and 1:0.9. The orifice thus formed may have two coaxial cylindrical wall sections of different diameters arranged in series, i.e. the larger cylindrical wall section closer to the inlet-side end and the smaller cylindrical wall section closer to the outlet-side end, or may be defined by an inversed frusto-conical wall.

Referring to FIG. 8 showing a preferred embodiment of the invention having two cylindrical wall sections of different diameters, an orifice consists three portions of an upper bore 25 through which the molten glass is introduced into the orifice, a lower bore 26 facing the ambient air and adapted to release the molten glass into the atmosphere and an intermediate portion 27 through which the bores 25, 26 are connected to each other. The lower bore 26 has a diameter smaller than that of the upper bore 25, so that the distance between the walls of the lower bores of adjacent orifices can be made smaller than in the conventional arrangement, without necessitating to reduce the distance between the axes of these orifices.

Turning now to FIG. 9 showing the orifice after a use for a considerably long period, it will be seen that the lower edge 28 of the lower bore 26 has been worn down to have a slightly larger diameter. However, since the diameter of the lower bore is originally small, the distance between the brims 29 of adjacent orifices is still large enough to ensure the separate state of the glass cones, in spite of the wearing.

Although the flow of the molten glass through the orifice is encountered by an increased resistance due to the smaller diameter of the lower bore 26 and, therefore, is limited, the larger diameter at the upper bore 25 is enough to compensate for the reduction of the flow rate. To this end; the axial length of the upper and the lower bores are determined to provide a desired flow rate of the molten glass. The intermediate portion 27 connecting both bores 25 and 26 to each other is preferably tapered at any desired inclination to the horizontal plane.

The flow rate of the molten glass provided by an orifice plate having orifices as shown in FIGS. 8 and 9 is given by the following equation (3):

$$Q = \frac{KnH}{\eta} \times \frac{1}{\frac{Lx}{X^4} + \frac{Ly}{Y^4} + \frac{\tan \theta (x^3 - y^3)}{6 X^3 Y^3}}$$

where,
Q: flow rate of molten glass (g/min)
K: constant
n: number of orifices
H: head of glass (cm)
$\eta$: viscosity of glass (poise)
X: diameter of upper bore (cm)
Lx: axial length of upper bore (cm)
Y: diameter of lower bore (cm)
Ly: axial length of lower bore (cm)
$\theta$: angle of inclination of tapered intermediate portion It has been confirmed that the most satisfactory result is obtained when the ratio of the diameter of the upper bore 25 which presents a smaller flow resistance to the diameter of the lower bore 26 which causes a larger flow resistance is 1:0.4 to 1:0.9, and when the axial length of the lower bore is ⅜ of the whole thickness of the orifice plate or smaller but larger than 0.20 mm. When the diameter of the lower bore is greater than 0.9 times that of the upper bore, the distance between the walls of the lower bores of the adjacent orifices is insufficient to provide the aforementioned advantage ensured by the provision of a reduced diameter portion of the orifice, so that the tendency of the joining of glass cones will be revealed after a use for a short period of three months. This period of durability is still unsatisfactory, although it improves the durability of conventional arrangement in which the tendency of the joining is actualized in three or four weeks. To the contrary, the diameter of the lower bore below 0.4 times that of the upper bore inevitably leads to an excessively large diameter of the upper bore. However, a too large diameter of the upper bore would result in a merging of the upper bores of adjacent orifices in each other. Thus, in order to maintain the individuality of the orifices, the distance between the axes of the orifices has to be made large, which is incompatible with the requirement of the "high density" at which the orifices are arranged. Alternatively, when the lower bore is made small to solve the above problem, the axial length thereof must be inevitably made small. This would cause such a trouble that the lower bore comes to be affected much by the precision of the boring technique. In addition, the flow of the molten glass would be improperly restricted, and would be largely varied in accordance with the change in shape of the lower bore due to the wear thereof.

Thus, it is concluded here that the orifice plate can sustain for a longer period, avoiding the disadvantage attributable to the wearing down at the outlet-side ends of the orifices, when the ratio of the diameter of the lower bore to that of the upper bore practically acceptable is within the range between 0.4 and 0.9.

The same result has been confirmed in an orifice plate as shown in FIG. 10, which is another embodiment of the invention. This orifice plate has plane surfaces and is provided with a number of orifices each having an inversed frusto-conical wall. The ratio of the diameters of the orifice at the inlet side 31 to the outlet side 32 is also selected to fall within a range between 1:0.4 and 1:0.9.

The effect of the invention in checking the joining of the glass cone can be judged most evidently by a parameter of whether a joining takes place when the glass filaments are drawn manually after stopping the take-up winder or the strand is drawn by means of a device such as a pull roller capable of pulling the strand at a reduced speed of 20 m/min. or so. Alternatively the effect may be judged from the time required for separating the molten glass flooding over the surface of the orifice plate completely into separate filaments. Also, the temperature rise of the orifice by which the joining of glass cones is caused can provide a base for judging the superiority of the invention.

By way of a reference, the following Table 2 shows a tendency of joining of the glass cones exhibited by a conventional orifice plate having 2000 orifices each in a form of straight bore, in fresh state and after use for 1 and 2 months. The orifices is dimensioned as shown in the Table 1.

Table 1

|  | Orifice |
| --- | --- |
| Diameter of orifice | 1.20 mm |
| Distance between walls of adjacent orifice | 0.70 mm |
| Axial length of orifice | 2.00 mm |
| Size of orifice plate 230 × 46 × 2 (mm) | |

Table 2

|  | Fresh state | 1 month after | 2 months after |
| --- | --- | --- | --- |
| Joining due to decrease of tension | No joining | Joining observed | Joining observed |
| Time required for separation (min.) | 3 to 8 | 12 to 18 | 15 to 20 |
| Temperature rise of orifice plate | 38° C | 22° C | 18° C |

In good contrast to the above conventional orifice plate, the orifice plate in accordance with the invention incorporating orifices having different diameter upper and lower cylindrical sections as shown in the Table 3 exhibited a result as shown in the following Table 4.

Table 3

|  | Orifice |
| --- | --- |
| Dia. of upper bore | 1.40 mm |
| Axial length of upper bore | 1.33 mm |
| Dia. of lower bore | 1.00 mm |
| Axial length of lower bore | 0.56 mm |
| Angle of inclination of tapered intermediate portion | 30° |
| Ratio of diameters (lower/upper) | 0.71 |
| Distance between walls of adjacent lower bores | 0.90 mm |
| Overall length of orifice | 2.00 mm |
| Size of orifice plate 230 × 46 × 2 (mm) | |

Table 4

|  | Fresh state | 1 month after | 2 months after | 6 months after |
| --- | --- | --- | --- | --- |
| Joining due to decrease of tension | No joining | No joining | No joining | No joining |
| Time required for separation (min.) | 3 to 8 | 3 to 8 | 3 to 8 | 4 to 12 |
| Temperature rise of orifice plate | 60° C | 40° C | 40° C | 34° C |

Similarly, the Table 6 shows a result of a test conducted on an orifice plate of the invention incorporating densely arranged orifices having an inversed frusto-conical wall as shown in Table 5 below.

Table 5

|  | Orifice |
| --- | --- |
| Dia. of upper opening | 1.40 mm |
| Dia. of lower opening | 1.00 mm |
| Ratio of dia. (lower/upper) | 0.71 |
| Distance between lower brims of adjacent orifices | 0.90 mm |
| Overall length of orifice | 2.00 mm |
| Size of orifice plate 230 × 46 × 2 (mm) | |

Table 6

|  | Fresh state | 1 month after | 2 months after | 6 months after |
| --- | --- | --- | --- | --- |
| Joining due to decrease of tension | No joining | No joining | No joining | No joining |
| Time required for separation (min.) | 3 to 8 | 3 to 8 | 3 to 9 | 4 to 13 |
| Temperature rise of orifice plate | 60° C | 40° C | 37° C | 32° C |

Throughout the tests, the conventional orifice plate which showed the operation efficiency of 95% at its fresh state exhibited the operation efficiency lowered to 85% after the use for one month. Two months after from the beginning of the use, the operation efficiency was further decreased uneconomically to less than 80%. This is of course attributable to the increase of the tendency of joining and a consequent suspension of the apparatus for retrieving the separate condition of the filaments.

In good contrast, the orifice plates of the invention having a size equivalent to that of the conventional one and provided with the same number, i.e. 2000, of orifices showed minimum tendency of the joining even after the use for 6 months, thereby preserving a high operation efficiency. More specifically, the operation efficiency was as high as 95% after the use for 2 months, and still high as 94% even after the use for 6 months.

This advantageous result is wholly attributable to the fact that the distance between marginal edges of adjacent orifices at the outlet side thereof can be increased, without being accompanied by an increasement of the distance between the axes of adjacent orifices, i.e. while holding the high density of orifices. It is true that the brims of the orifices suffers from wearing down, even in case of the present invention. However, such wearing is not developed to an extent to cause the joining of the glass cones, even after the use for 6 months, thereby ensuring the good operation efficiency.

For informations, the distance between the lower brims of adjacent orifices of the invention was 0.90 mm before the use. The distance was then decreased to 0.75 mm after the use for one month, to 0.70 mm for two months and to 0.64 mm for 6 months. This shows that the progress of the wearing is hard at an earlier stage of use but becomes slower after some wearing has been developed. The distance between the lower brims of adjacent orifices in accordance with the invention after the use for six months is still as large as that of the conventional one before the use.

In the conventional arrangement of the orifices as shown in Table 1, the distance between the walls of adjacent orifices are rapidly reduced from 0.70 mm to 0.50 mm, in a short period of use of 2 months, so as to increase the tendency of the joining of glass cones.

Any material used for conventional orifice plates may employed for the orifice plate of the invention. It has been confirmed, as a series of tests, the operation efficiency is remarkably improved in orifice plates of the invention made of alloys of 90% platinum and 10% rhodium; 75% platinum and 25% rhodium; 86% platinum, 9% rhodium and 5% gold; 90% platinum, 5% palladium and 5% gold; and the like, respectively, although these plates showed somewhat different rates of wear depending on the nature of the material.

The orifice plate of the invention having specific shapes of orifices can be manufactured without substantial difficulty, by a conventional boring process employing drills or reamers and a subsequent finishing which can be performed also by conventional techniques.

The advantageous effects of the invention will be realized by those skilled in the art from the following description of examples.

EXAMPLE 1

A spinning hearth having an orifice plate provided with orifices each having upper and lower bores of different diameters as specified in the annexted Table 7 was operated in the following condition. Change in characteristics was observed as shown in the Table 8.

Specification of Orifice plate and Condition of Operation

Size of orifice plate: 250 × 46 × 2 mm
Material of orifice plate: 90Pt-5Au-5Pd
Number of orifices: 2008
Distance between axes of orifices: 1.90 mm
Spinning rate: 850 g/min.
Take-up speed: 300 to 1100 m/min.

Table 7

|  | Orifice |
| --- | --- |
| Dia. of upper bore | 1.50 mm |
| Axial length of upper bore | 1.34 mm |
| Dia. of lower bore | 1.00 mm |
| Axial length of lower bore | 0.51 mm |
| Angle of inclination of tapered | |

Table 7-continued

|  | Orifice |
| --- | --- |
| intermediate portion | 30° |
| Ratio of dia. (lower/upper) | 0.67 |
| Distance between walls of lower bore of orifices | 0.90 mm |
| Overall length of orifice | 2.00 mm |

Table 8

|  | Fresh state | 2 months after | 6 months after | 10 months after |
| --- | --- | --- | --- | --- |
| Joining due to decrease of tension | No joining | No joining | No joining | No joining |
| Time required for separation (min.) | 3 to 8 | 3 to 8 | 4 to 10 | 4 to 12 |
| Temperature rise of orifice plate | 47° C | 43° C | 38° C | 34° C |
| Distance between walls of lower bores of orifices | 0.90 | 0.74 | 0.68 | 0.65 |
| Operation efficiency | 96% | 95% | 95% | 93% |

EXAMPLE 2

A spinning hearth having an orifice plate provided with inversed frusto-conical orifices as specified in the Table 9 was operated in the following condition and changes in characteristics was observed as shown in the annexed Table 10.

Specification of Orifice Plate and Condition of Operation

Size of orifice plate: 380 × 48 × 2.5 mm
Material of orifice plate: 90Pt-5Au-5Pd
Number of orifice: 4008
Distance between axes of orifices: 1.90 mm
Spinning rate: 1500 g/min.
Take-up speed: 300 to 850 m/min.

Table 9

|  | Orifice |
| --- | --- |
| Dia. of upper opening | 1.30 mm |
| Dia. of lower opening | 1.05 mm |
| Ratio of dia. (lower/upper) | 0.81 |
| Distance between lower brims of adjacent orifices | 0.85 mm |
| Overall length of orifice | 2.50 mm |

Table 10

|  | Fresh state | 2 months after | 6 months after | 10 months after |
| --- | --- | --- | --- | --- |
| Joining due to decrease of tension | No joining | No joining | No joining | No joining |
| Time required for separation (min.) | 5 to 10 | 5 to 10 | 6 to 12 | 8 to 15 |
| Temperature rise of orifice plate | 48° C | 43° C | 38° C | 33° C |
| Distance between lower brims of adjacent orifices | 0.85 | 0.68 | 0.64 | 0.56 |
| Operation efficiency | 94% | 94% | 92% | 90% |

Having described the invention through specific embodiments, it is to be noted that the description is only for the illustrating purpose, and various changes and modifications may be imparted to the described embodiments without substantially departing from the scope of the invention which is delimited solely by the appended claims.

What is claimed is:

1. An orifice plate for use in glass-fiber spinning hearth having a flat undersurface and a plurality of orifices arranged therein at a high density, in which each of said orifices has a ratio of a diameter at its glass-inlet side to that at the glass-outlet side between 1:0.4 and 1:0.9.

2. An orifice plate as claimed in claim 1, in which said orifice has two coaxial cylindrical wall sections of different diameters arranged in series.

3. An orifice plate as claimed in claim 2, in which the axial length of said cylindrical wall section having the smaller diameter is not larger than $\frac{3}{4}$ of the thickness of said orifice plate and not smaller than 0.20 mm.

4. An orifice plate as claimed in claim 1, wherein said orifice has an inversed frusto-conical shape.